US012748297B2

(12) United States Patent
Bird et al.

(10) Patent No.: US 12,748,297 B2
(45) Date of Patent: Sep. 29, 2026

(54) MAGNETIC EYECUP FOR BINOCULARS, SPOTTING SCOPE, OR OTHER OUTPUT OPTICAL DEVICE

(71) Applicant: LEUPOLD & STEVENS, INC., Beaverton, OR (US)

(72) Inventors: Zachary M. Bird, Beaverton, OR (US); Tim Lesser, Beaverton, OR (US)

(73) Assignee: LEUPOLD & STEVENS, INC., Beaverton, OR (US)

( * ) Notice: Subject to any disclaimer, the term of this patent is extended or adjusted under 35 U.S.C. 154(b) by 231 days.

(21) Appl. No.: 18/440,135

(22) Filed: Feb. 13, 2024

(65) Prior Publication Data

US 2024/0272419 A1 Aug. 15, 2024

Related U.S. Application Data

(60) Provisional application No. 63/484,665, filed on Feb. 13, 2023.

(51) Int. Cl.
*G02B 23/18* (2006.01)
*G02B 25/00* (2006.01)

(52) U.S. Cl.
CPC ........... *G02B 23/18* (2013.01); *G02B 25/001* (2013.01)

(58) Field of Classification Search
None
See application file for complete search history.

(56) References Cited

U.S. PATENT DOCUMENTS

| | | | | |
|---|---|---|---|---|
| 4,523,818 | A | 6/1985 | Lang et al. | |
| 9,122,131 | B2 | 9/2015 | Coppage et al. | |
| 9,191,562 | B1 | 11/2015 | Schorr, II | |
| 10,215,212 | B2 * | 2/2019 | Hyers | G03B 17/48 |
| 10,348,946 | B2 | 7/2019 | Barros et al. | |
| 10,877,296 | B2 | 12/2020 | Lindsey et al. | |
| 10,945,673 | B2 * | 3/2021 | Lozano-Buhl | A61B 90/361 |
| 11,675,252 | B2 | 6/2023 | Crispin et al. | |
| 12,181,781 | B2 | 12/2024 | Crispin et al. | |
| 2003/0025993 | A1 | 2/2003 | Crista | |
| 2009/0268284 | A1 * | 10/2009 | Yamamoto | G02B 23/18 359/407 |

(Continued)

FOREIGN PATENT DOCUMENTS

| | | |
|---|---|---|
| FR | 3107965 A1 | 9/2021 |
| JP | 6990368 B1 | 1/2022 |

(Continued)

OTHER PUBLICATIONS

Barros, "The Designing of the Moment Photo Case," https://www.shopmoment.com/momentist/the-designing-of-the-momth-photo-case, Mar. 5, 2017, Accessed May 8, 2019' 21 pages.

(Continued)

*Primary Examiner* — Robert E. Tallman
(74) *Attorney, Agent, or Firm* — Schwabe, Williamson & Wyatt, P.C.

(57) ABSTRACT

Various embodiments described herein may include one or more magnetic eyecups that both secure and align the optical axis of an input optical device (such as a smartphone camera) to an output optical device (such as binoculars, a spotting scope, rangefinders, a projectile weapon scope, or the like), through the use of magnets. Other embodiments may be disclosed and/or claimed.

22 Claims, 6 Drawing Sheets

(56) References Cited

U.S. PATENT DOCUMENTS

Figure 1:
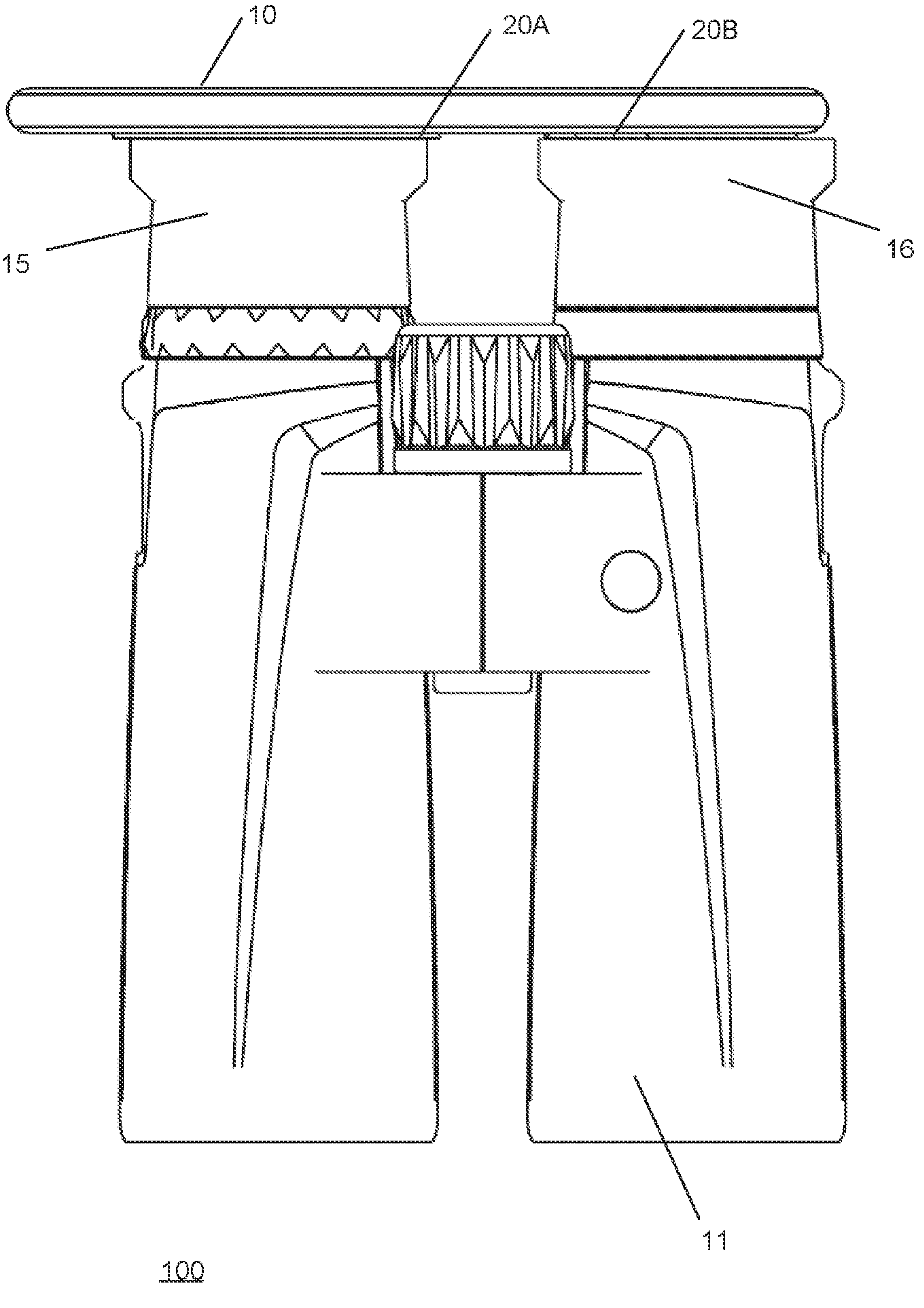

| | | | | |
|---|---|---|---|---|
| 2015/0362828 | A1 | 12/2015 | Patel et al. | |
| 2017/0086650 | A1* | 3/2017 | Valika | A61B 1/0014 |
| 2018/0259118 | A1 | 9/2018 | Shen | |
| 2019/0141221 | A1 | 5/2019 | Barros et al. | |
| 2020/0019042 | A1* | 1/2020 | Crispin | G03B 17/565 |
| 2020/0028995 | A1 | 1/2020 | Jain | |
| 2020/0116298 | A1 | 4/2020 | Senatorov | |
| 2021/0067616 | A1 | 3/2021 | Penfold | |
| 2022/0299748 | A1 | 9/2022 | Scovil et al. | |
| 2022/0397806 | A1* | 12/2022 | Gibbens | G02B 23/16 |
| 2022/0397811 | A1 | 12/2022 | Goodworth et al. | |

FOREIGN PATENT DOCUMENTS

| | | | |
|---|---|---|---|
| KR | 200470461 | Y1 | 12/2013 |
| KR | 20150021874 | A | 3/2015 |
| WO | 2017064336 | A | 4/2017 |
| WO | 2022261071 | A1 | 12/2022 |

OTHER PUBLICATIONS

Carson, "Hoookupz 2.0—Smartphone Optics Adapter," https://www.carson.com/hookupz2/, Accessed May 8, 2019' 3 pages.

Elk Network—Spotting Scope Adapter; Gear101 First Look—Hands on With the New Magview Spotting Scope Adapter dated Jun. 30, 2022; Downloaded from the Internet at <https://www.rmef.org/elk-network/gear-101-first-look-hands-on-with-the-new-magview-spotting-scope-adapter/>; 7 pages.

European Patent Office, International Search Report and Written Opinion of the International Searching Authority in PCT Application No. PC/US2024/015513, mailed Nov. 11, 2024, 13 pages.

GOHUNT MagView Phone Plate web page; Downloaded from the Internet on Feb. 10, 2023 at <https://shop.gohunt.com/products/magview-phone-plate>; 5 pages.

MagView product web page; Downloaded from the Internet on Feb. 6, 2023 at <https://magviewgear.com>; 6 pages.

* cited by examiner

MAGNETIC EYECUP FOR BINOCULARS, SPOTTING SCOPE, OR OTHER OUTPUT OPTICAL DEVICE

RELATED APPLICATION

This application is a non-provisional of and claims priority benefit to U.S. provisional application Ser. No. 63/484,665, filed on Feb. 13, 2023, which is incorporated by reference herein in its entirety. The subject matter described in this application is related to U.S. patent application Ser. No. 16/505,582, entitled INTERFACE FACILITY, filed on Jul. 8, 2019, which is incorporated by reference herein in its entirety.

TECHNICAL FIELD

The present disclosure relates to the attachment of external optics to input optical devices (e.g., camera devices such as smartphones) and, more particularly, to an output optical device (e.g., binoculars, a spotting scopes, rangefinders, projectile weapon scopes, telescopes, and microscopes, or the like) including one or more eyecups magnetically attachable to an input optical device such that the input optical device can take pictures and/or video through the lens(es) of the output optical device.

BACKGROUND

Smartphone cameras are widely used for photography, partially because the quality of their cameras continues to improve. However, smartphone cameras still have limitations compared to conventional DSLR (digital single-lens reflex) cameras because of the limited quantities and types of lenses that are built-in to existing smartphone cameras. Add-on external lenses that mimic the capabilities of interchangeable lenses for DSLR cameras have become increasingly popular. Some versions connect an external lens to the exterior of the smartphone, and others rely on a bayonet-style mount to connect an external lens to a dedicated smartphone case.

Bayonet-style mounts are used to attach interchangeable lenses to modern DSLR cameras because the bayonet mechanism precisely aligns mechanical and electrical features between the lens and the camera body. Bayonet-style mounts usually have three to four tabs around the base of the lens that are received by recesses in the lens mounting plate on the front of the camera body. The tabs are often identified in some way to ensure that the lens is only inserted in one orientation, often by making one tab a different size or by marking a section of the lens and a section of the camera body. Once the tabs are inserted into the recesses, the lens is fastened by rotating the lens until the lens is locked into place. The lens is retained in place by a spring-loaded pin, which is operated to remove the lens.

There is also a desire to connect smartphones to output optical devices so the smartphone's camera can take pictures and/or video through the output optical device. Various systems have been developed that enable a smartphone to be attached to the eyepiece of binoculars, telescopes, microscopes, and other output optical devices, such as the system described in the '582 application.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

FIG. 1 schematically illustrates a top view of an optical device assembly (e.g., a binocular assembly) including magnetic eyecups that both secure and align the optical axis of an input optical device (e.g., a smartphone) to an output optical device (e.g., binoculars), according to various embodiments.

Figure 2:
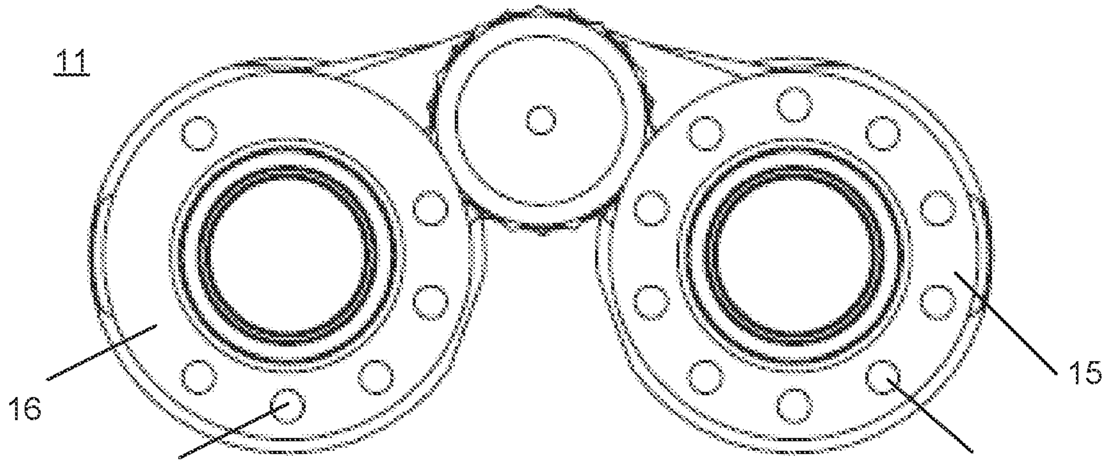

FIG. 2 schematically illustrates a rear end view of the output optical device (e.g., binoculars) of FIG. 1.

Figure 3:
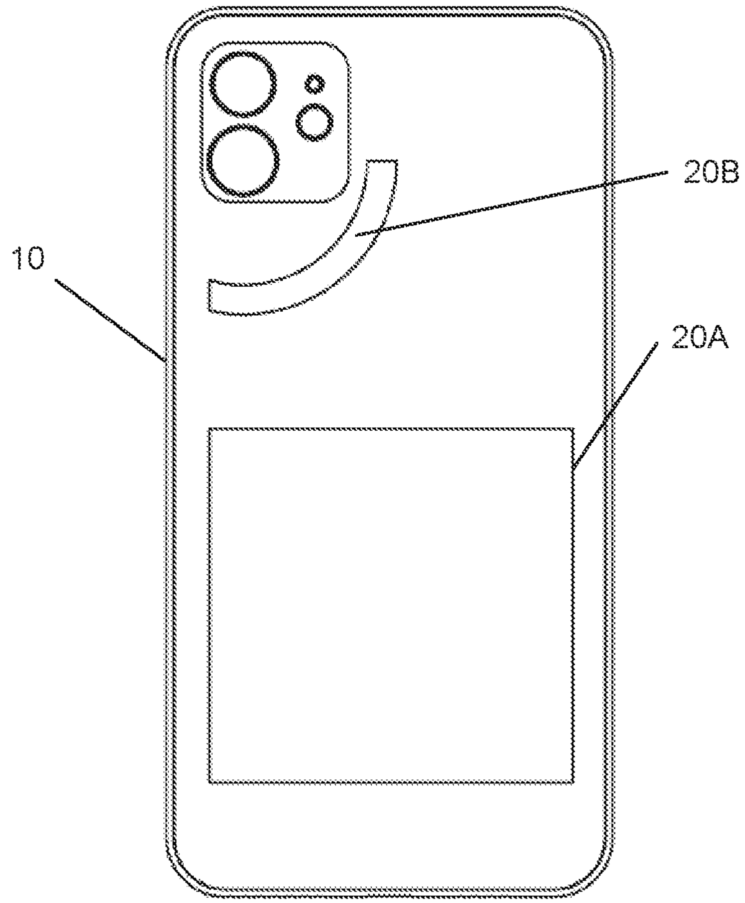

FIG. 3 schematically illustrates a top view of the adapter system of FIG. 1, in which the adapter system is coupled to a backside of the input optical device (e.g., a smartphone) of FIG. 1.

Figure 4:
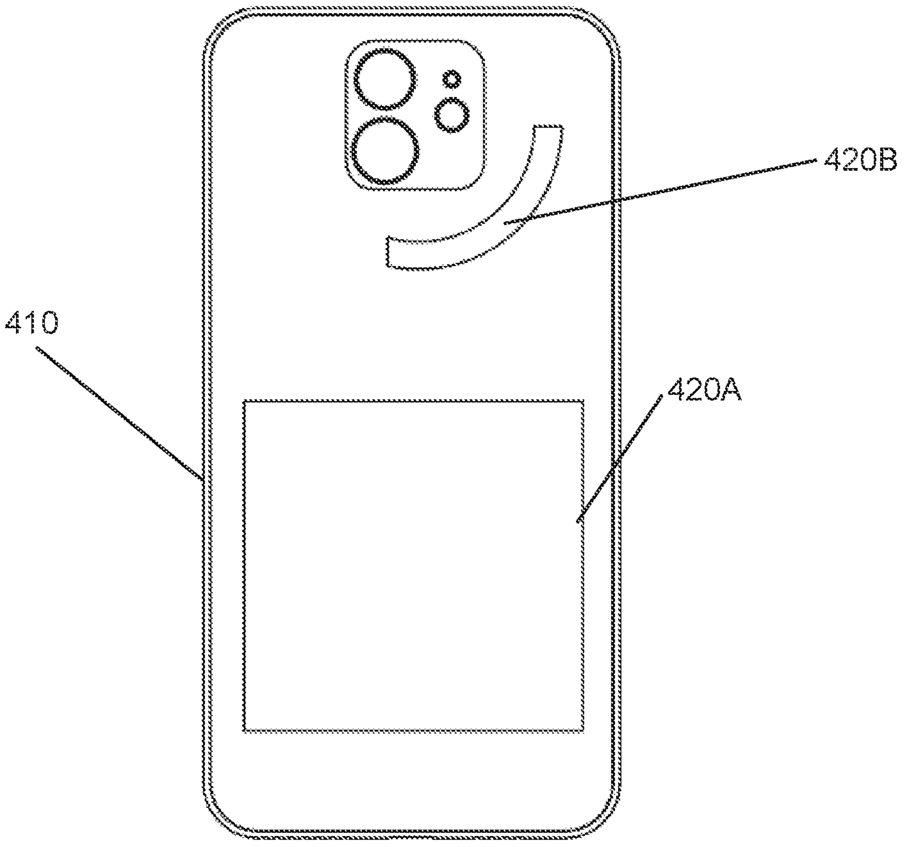

FIG. 4 schematically illustrates a top view of another adapter system, in which the adapter system is coupled to a backside of another input optical device (e.g., another smartphone), according to various embodiments.

Figure 5:
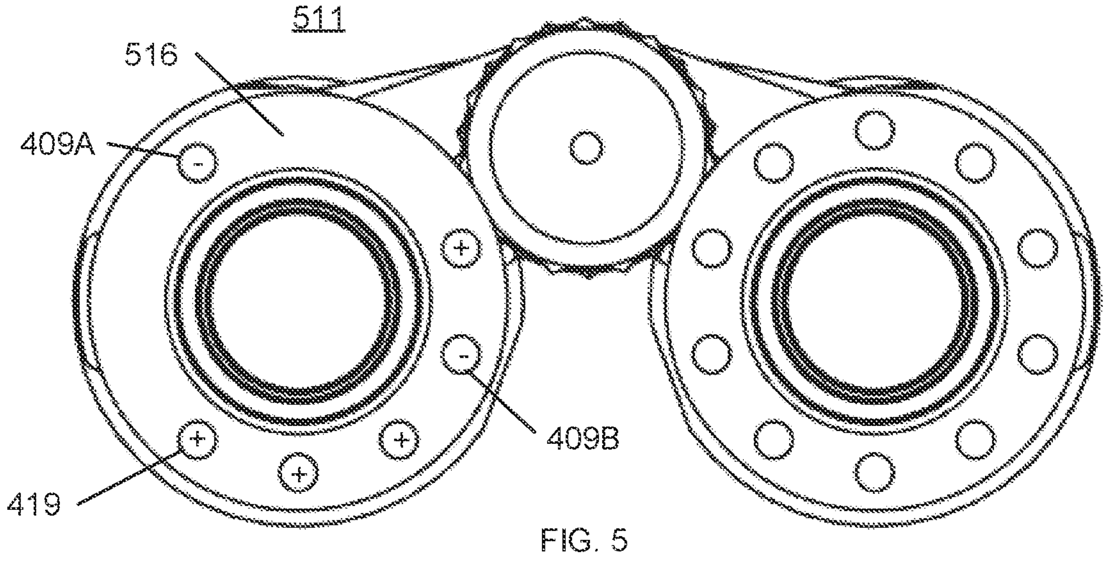

FIG. 5 schematically illustrates a rear end view of another output optical device (e.g., another binoculars), according to various embodiments.

Figure 6:
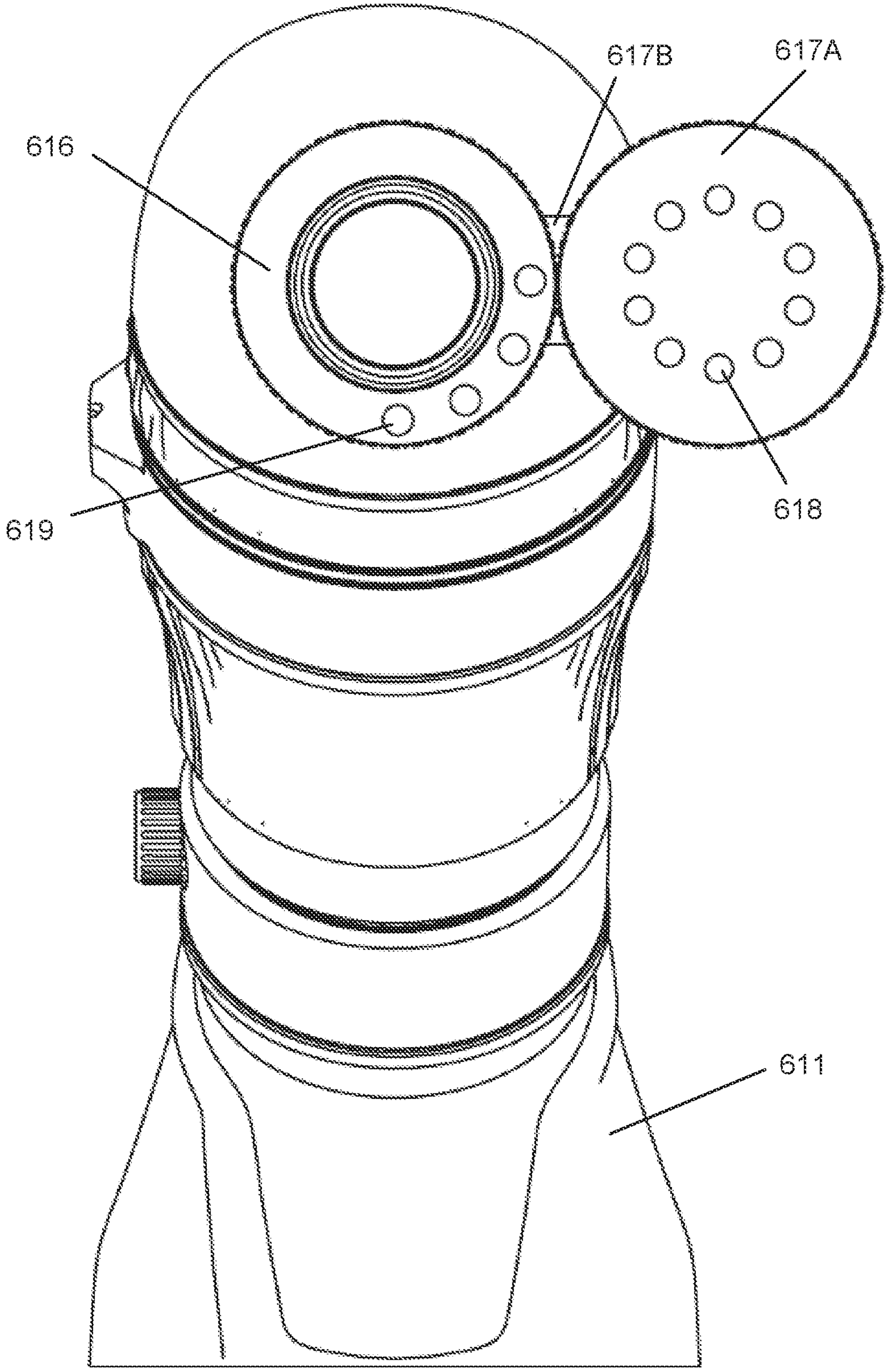

FIG. 6 schematically illustrates a rear end view of an output optical device (e.g., a spotting scope) with its eyecup cover opened.

Figure 7:
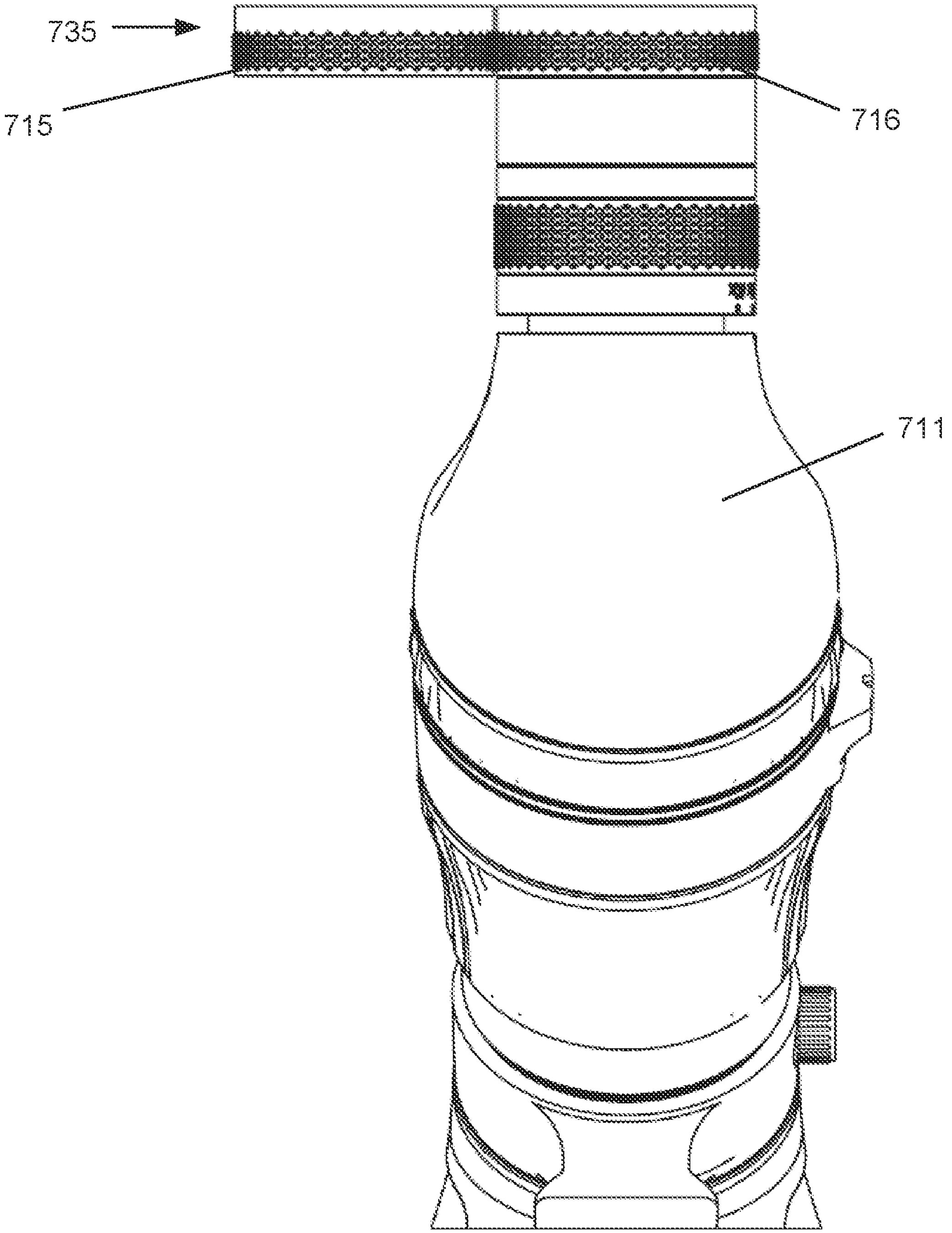

FIG. 7 schematically illustrates a bottom view of yet another output optical device (e.g., another spotting scope), according to various embodiments.

Figure 8:
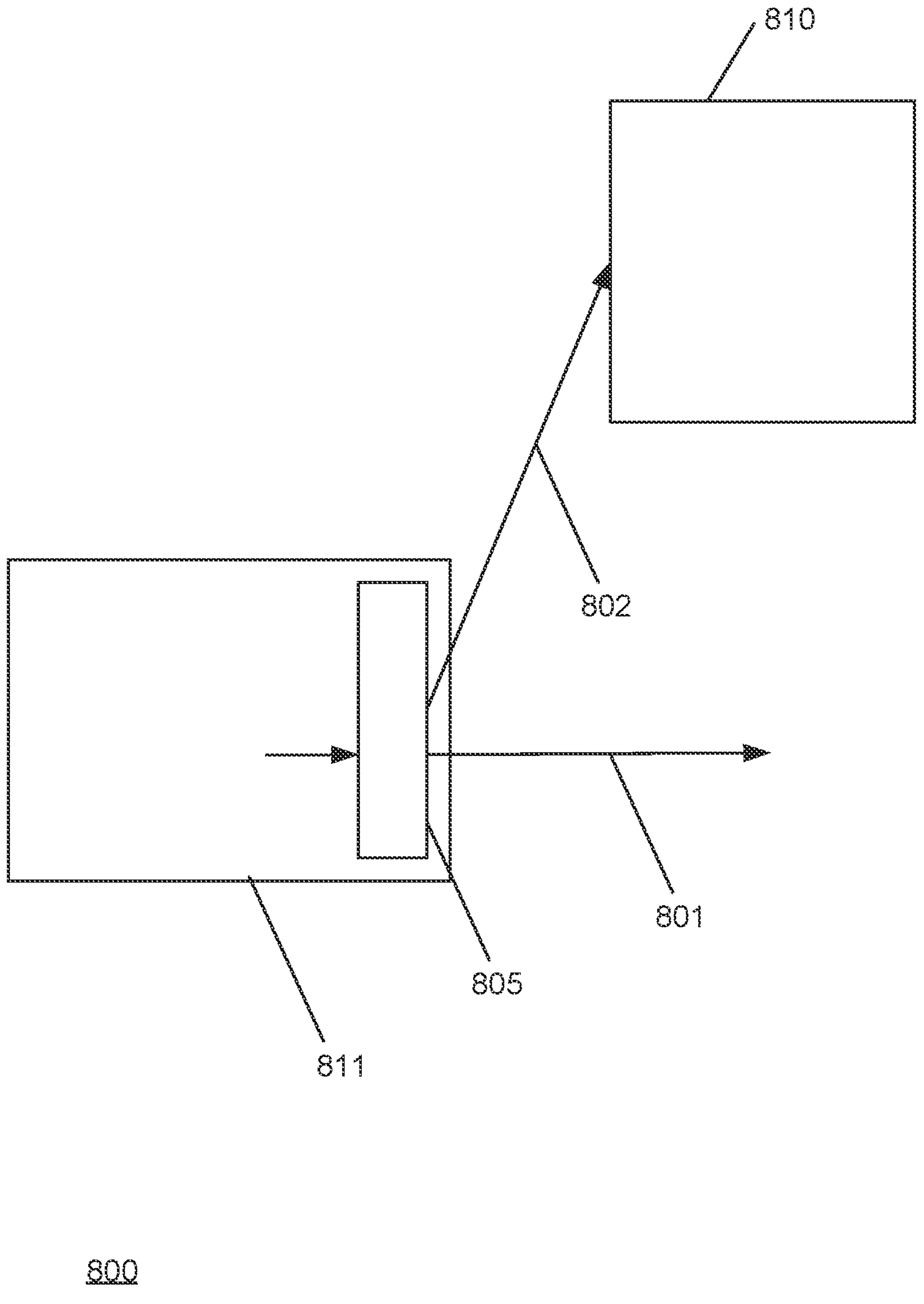

FIG. 8 schematically illustrates another optical device assembly having a magnetic rear end that both secures and aligns the optical axis of an input optical device (e.g., a smartphone) to an output optical device (e.g., a spotting scope) that includes a beam splitter, according to various embodiments.

DETAILED DESCRIPTION

Some "digiscope" adapters may require large intrusive cases in conjunction with "adapters" that need to be fixed to the optic, requiring multiple connections and custom cases. The '582 application describes an embodiment of an interface facility that uses a case fitting around a back and sides of a smartphone (e.g., a case has a back with a recess to receive the smartphone). The eyecup of the output optical device and the front side of the case are mechanically interlocking, and it is this mechanical interlocking feature that rotationally times the case (and thus the smartphone) to the eyecup (the mechanical interlocking prevents rotation of the eyecup assembly relative to the phone/case assembly). Undesirable axial movements of an eyecup (e.g., unwanted extension or retraction) may also be prevented using eyecup locking features described in the '504 application. In some embodiments described in the '504 application, in addition to the mechanical timing features, magnets may also be located in both the output optical device and the case as described with reference to FIGS. 9 and 10.

Instead of using mechanical interlocking to rotationally time a smartphone assembly to an eyecup of an output optical device as described in the '504 application, various embodiments described herein are arranged to rotationally time an input optical device assembly (e.g., a smartphone assembly) to one or more eyecups of an output optical device using magnetic coupling.

Embodiments using magnetic coupling to rotationally time the input optical device assembly to the one or more eyecups of the output optical device (instead of mechanical interlocking) do not require recessing on the one or more eyecups. For example, the one or more eyecups may have a planar or other continuous surface, which may be desirable for a user and/or may reduce manufacturing costs.

Another advantage of an embodiment using magnetic coupling to rotationally time the input optical device assembly to the one or more magnetic eyecups of the output optical device (instead of mechanical interlocking), is that a thick case with recessing is not required. Various embodiments described herein may use a thin, compact adapter system affixed to a back of a smartphone. The thin, compact adapter system may have a length, width, and/or depth that is less than the length, width, and/or depth of the smartphone. This thin, compact adapter system may be comprised of a first ferromagnetic material, such as a magnetic material or a metal that interacts with a magnetic material. In one embodiment, the compact adapter is a ferromagnetic metal plate.

In some embodiments, the thin, compact adapter system may be user-installable on the user's existing smartphone. In some embodiments, the compact adapter system may include one or more adapter bodies to mount to a subarea of the back of the smartphone using any attachment mechanism now known or later developed, such as adhesives, fasteners, or the like.

Various magnetic eyecup embodiments described herein may include magnets embedded within one or more eyecups, to allow both a secure magnetic connection to the one or more adapter bodies, while also being optically aligned.

FIG. 1 schematically illustrates a top view of an optical device assembly 100 (e.g., a binocular assembly) including magnetic eyecups 15 and 16 that both secure and align the optical axis of an input optical device 10 (e.g., a smartphone) to an output optical device 11 (e.g., binoculars), according to various embodiments. FIG. 2 schematically illustrates a rear end view of the output optical device 11 (e.g., binoculars) of FIG. 1. FIG. 3 schematically illustrates a top view of the adapter system FIG. 1, in which the adapter system is coupled to a backside of the input optical device 10 (e.g., a smartphone) of FIG. 1.

Referring now to FIG. 2, surfaces of the magnetic eyecup 15 need not include recessing, and as such may have a planar, non-recessed surface and/or continuous surface. In one embodiment, the magnets may be fully embedded within one or more eyecups to provide continuous annular surfaces on the one or more eyecups (the magnetics may be covered by a thin non-magnetic material, such as plastic, that provides the continuous annular surfaces).

While it may be desirable to fully embed the magnets in some embodiments, in other embodiments the annular surfaces may have openings to expose a surface of magnetic packages (the magnetic packages may be located in recesses in a backside of the eyecup surfaces—not shown). The exposed surfaces of the magnetic packages may be located in a same plane as the annual surfaces of the eyecups.

Turning now to the input optical device assembly (FIG. 3), an adapter body 20A and an alignment adapter body 20B are affixed to a backside of a smartphone 10. The adapter bodies 20A and 20B may be mounted to the backside of the smartphone 10 using any attachment mechanism now known or later developed, such as adhesives, fasteners, or the like. The adapter system including the adapter bodies 20A and 20B is more compact than some known smartphone cases—in particular the adapter system has a total length and total width that is less than the length and width of the smartphone 10, and covers only a subarea of the back of the smartphone 10, as illustrated.

The adapter bodies 20A and 20B, one or both of which may be a ferromagnetic metal plate, are mounted to a single side of the smartphone 10 (e.g., the back), in contrast to some smartphone cases that may couple to multiple sides of a smartphone (e.g., the sides and/or front). Accordingly, the adapter system may be thin (e.g., a total thickness less than a thickness of the smartphone 10, such a fraction of the smartphone thickness), unlike some known cases.

In this embodiment, the adapter system includes metal adapter bodies 20A and 20B in which the metal is a first ferromagnetic material. In other examples, the adapter system may be a single monolithic metal adapter body (e.g., an adapter body including a section to provide a function similar to similar to adapter body 20A, and an alignment arm to provide a function similar to a function provided by the alignment adapter body 20B). In yet other embodiments, the adapter system may be comprised of more than one part assembled together, in which one or more parts are ferromagnetic materials (such as magnets or a metal) and other part(s) are some other material, such as plastic or a non-ferromagnetic metal.

Referring now to both FIGS. 2 and 3, the main attachment magnetic eyecup 15 (FIG. 2) may magnetically couple to the adapter body 20A (FIG. 3). The main attachment magnetic eyecup 15 may include magnets arranged in a ring, as illustrated, to provide a uniformly distributed magnetic force to couple to the adapter body 20A. This coupling may have a first total magnetic strength.

The alignment connection magnetic eyecup 16 may have a different quantity of magnetics (e.g., less magnets) and/or may be arranged to provide a non-uniformly distributed magnetic force, as illustrated. In some embodiments (not shown), the alignment connection magnetic eyecup 16 may contain a ferromagnetic metal (instead of including embedded magnets) to couple to at least one magnet in the alignment adapter body 20B (FIG. 3).

A user may position part of the alignment connection magnetic eyecup 16 relative to the alignment adapter body 20B as needed to align the optical axis of the input optical device (e.g., the smartphone 10) to the optical axis of the output optical device, so that the user can take pictures or video through the alignment connection magnetic eyecup 16. In various embodiments, a user may align at least one magnet of one of the alignment connection magnetic eyecup 16 or the alignment adapter body 20B to a ferromagnetic metal or magnet of the other of the alignment connection magnetic eyecup 16 or the alignment adapter body. In cases in which magnets are aligned, the magnets may have opposite polarity so that they are attracted to each other. This coupling may have a second total magnetic strength that may be different than the first total magnetic strength (e.g., less total magnetic strength).

Alignment of the magnetic eyecup 16 to the alignment adapter body 20B may be achieved by first connecting magnetic eyecup 15 to the adapter body 20A and then adjusting (e.g., pivoting) the smartphone as needed to magnetically couple the other magnetic eyecup 16 to the alignment adapter body 20B. Once the magnetic eyecups 15 and 16 are magnetically coupled to the adapter bodies 20A and 20B, respectively, the input optical device assembly will be rotationally timed by the magnets (e.g., may resist rotation due to the magnetic forces coupling the magnetic eyecups 15 and 16 to the adapter bodies 20A and 20B, respectively).

In the illustrated example, the adapter system includes a ferromagnetic adapter body 20A and an additional alignment adapter body 20B (that may include a ferromagnetic material and/or at least one magnet). In other examples, such as when the output optical device includes only a single eyecup, the adapter system may include only a ferromagnetic adapter body to couple to the single eyecup (i.e., no alignment adapter body). In these embodiments, more magnets may be embedded in the eyecup assembly and/or stronger magnetic force per magnet may be used, to rotationally time the input optical assembly to the output optical device.

In other embodiments in which an output optical device includes only a single magnetic eyecup, the adapter system may have a shape in which only a subset of the magnets of the single magnetic eyecup magnetically couple to the adapter system at any given position. For example, the adapter may have a main body and an alignment arm to couple to the single eyecup (the main body may couple to a first quantity of the magnets of the single eyecup and the alignment arm may couple to a second lesser quantity of the magnets of the single eyecup). This may allow rotational timing by magnetic force (without requiring mechanical timing features).

Any eyecup assembly described herein may include locking features now known, or later developed, to prevent the eyecup from retracting or protracting (from the load applied by the adapter assembly). In any embodiment described herein, an eyecup assembly may include any of the locking features described in the '582 application. In various embodiments, the compact size of the adapter, which minimizes a load applied by the camera assembly, may enable development of new locking features.

In various embodiments described above, the input optical device is a camera device, such as a mobile phone. In other embodiments, the input optical device may be some other input optical device including but not limited to a display device, such as a heads up display or other augmented reality display. Any of the features described herein may be used with any input optical device, now known or later developed.

In various embodiments, the same magnetic attachment interface to couple to the adapter system may also be used as an attachment interface for a cap to protect the magnetic eyecup(s). In these embodiments, the cap(s) may include ferromagnetic material to magnetically couple to the ferromagnetic material of the surface of the magnetic eyecup(s).

In various embodiments, the same magnetic attachment interface to couple to the adapter system may be used for output optical device accessories. In these embodiments, various accessories such as eyecup extensions for changing the shape of a basic eyecup may include ferromagnetic material to magnetically couple to the ferromagnetic material of the surface of the magnetic eyecup(s). In one embodiment, an accessory may include straps. Any output optical device accessory, now known or later developed, may include ferromagnetic material to magnetically couple to the ferromagnetic material of the surface of the magnetic eyecup (s).

In the illustrated embodiment, the adapter system includes more than one adapter body. However, this is not required. In another embodiment, an adapter system may be a single monolithic metal adapter body. In such an arrangement, the single adapter body may include a body and an alignment arm integrally formed with the body. The body may have dimensions similar to the adapter body 20A. The alignment arm may be a projection extending from the body. The projection may locate one or more magnets in a similar location that the alignment adapter body 20B is located.

In yet other examples, it may be possible and practical to fixably or releasably attach an alignment arm to a body (which may allow different alignment arms to be used with the same body for supporting different input optical devices). The alignment arm may be formed from a same material or a different material than the body. The alignment arm may include ferromagnetic material having similar dimensions as alignment adapter body 20B, and the adapter system may locate that ferromagnetic material in a similar location as alignment adapter body 20B. Preferably, any adapter body is a thin, compact device or assembly having a total length and width that is not greater than a total length and width of the input optical device, and may have a thickness similar to the thickness of any adapter system described herein.

FIG. 4 schematically illustrates a top view of another adapter system, in which the adapter system (e.g., adapter bodies 420A and 420B) is coupled to a backside of another input optical device (e.g., another smartphone), according to various embodiments. Various models of smartphones or other input optical device may have differing characteristics, such as a differing sizes, weights, and/or differing camera locations. For instance, the smartphone 410 has a camera located at a top center, instead of a top left corner as with the smartphone 10 (FIG. 3).

To support different input optical devices with different characteristics, different adapter system versions operable with a same output optical device may be provided. For instance, both adapter system versions (FIGS. 3 and 4) may be compatible with the same output optical device 10 (FIG. 1).

The different adapter system versions may have different dimensions, different quantities of adapter bodies, different magnetic arrangements (e.g., a stronger magnet for a heavier input optical device), or combinations thereof. In the illustrated example, both adapter system versions (FIGS. 3 and 4) may use the same parts arranged in different locations and/or orientations. Other examples of different adapter systems may include different part(s).

FIG. 5 schematically illustrates a rear end view of another output optical device 511 (e.g., another binoculars), according to various embodiments. In this embodiment, an alignment magnetic eyecup 516 uses alignment magnets of differing polarity (e.g., negative polarity magnets 409A and 409B, as well as positive polarity magnets 419).

In one embodiment, the magnets 409A and 409B may have a polarity arranged to repel a corresponding part of the input optical device assembly. When a user positions the input optical device assembly (not shown) near the alignment magnetic eyecup 516, the repelling force may resist an incorrect rotational orientation and/or urge the input optical device assembly into a correct rotational orientation. The magnets 419 may then fix the input optical device assembly into the correct rotational orientation. In other examples, the repelling force may be used to resist movement of the input optical device assembly once located in the correct rotational orientation. In this example, the main magnetic eyecup is illustrated as having a homogenous group of magnets; however, in other examples the main magnetic eyecup may have a heterogeneous group of magnets for similar reasons that the alignment magnetic eyecup 516 has a heterogeneous group of magnets.

As mentioned previously, an adapter system may include magnets and/or ferromagnetic metals (e.g., metals that interacts with magnets). In embodiments in which the adapter system also includes magnets, different polarities, different magnetic strengths, or the like, may be provided in the alignment section and/or the main section of an adapter system for similar reasons.

FIG. 6 schematically illustrates a rear end view of an output optical device 611 (e.g., a spotting scope) with its eyecup cover 617A opened. Some single eyecup devices (e.g., spotting scopes, telescopes, or the like) may have eyecup covers that pivot around an axis from fully closed to fully open (e.g., at least about one hundred and eighty degrees). In these single eyecup devices, magnets 618 (which may be similar in any respect to magnets 18 of FIG. 2) may be imbedded or located on the inside surface of the eyecup cover 617A.

The magnetic eyecup 616 may also include alignment magnets 619, as illustrated. The magnets 618 and 619 may perform a similar function as the magnets 18 and 19 of FIG. 2, respectively. Additionally, the magnets 618 and/or 619 may be used to perform an additional function—to magnetically secure the eyecup cover to the magnetic eyecup 616 in the fully closed positon.

The hinge 617B may include a stop device, which may prevent the eyecup cover from opening past a threshold amount, such as one hundred and eight degrees. In other embodiments, a stop device may be located in any other part (i.e. is not limited to being part of a hinge). Other examples may not utilize stop devices (for instance, an eyecup cover may be able to open past a threshold amount, such as past one hundred and eighty degrees), but may magnetically locate into a position similar to the eyecup cover 617A due to magnetic attraction to an adapter body of the input optical device assembly (not shown).

In the illustrated example, the magnetic eyecup 616 includes the alignment magnets 619 and the eyecup cover 617A includes the magnets 618. However, it may be possible and practical to reverse this arrangement in other examples of a single eyecup output optical device with an eyecup cover.

In some embodiments, it may be possible to use output optical device 611 with the same input optical device assembly of FIG. 1 (e.g., the same input optical device 10 and/or the same adapter bodies 20A and 20B). However, in other examples, output optical device 611 may use a different adapter system that the adapter system of FIGS. 1-3.

In various embodiments, one of a first section and a second alignment section of an adapter system may magnetically couple to a surface of a magnetic eyecup of an eyecup assembly. The other of the first section and the second alignment section may magnetically couple to a different part of the same eyecup assembly (e.g., a magnetic cover for the magnetic eyecup, or some other part of the same eyecup assembly).

FIG. 7 schematically illustrates a bottom view of yet another output optical device 711 (e.g., another spotting scope), according to various embodiments. In some output optical devices, an eyecup may be releasably coupled to a body of the output optical device. A user can swap the eyecup for various reasons, such as replacement or to optically re-configure the output optical device for a specific application. In these optical output devices, the releasably coupled eyecup may affix using any attachment interface, now known or later developed, such as tabs to releasably couple an eyecup to the body of the output optical device.

The output optical device 711 has a body including any attachment interface, now known or later developed, for releasably coupling an eyecup to the body of the output optical device. A user may employ a single eyecup (not shown) releasably coupled to the body of the output optical device for applications that do not involve an input optical device.

When the user desires to use an input optical device (e.g., a smartphone) with the output optical device 711, the user may release the single eyecup (not shown) from the attachment interface, and then releasably couple the eyecup assembly (with may include a pair of eyecups) thereon. The eyecup assembly includes magnetic eyecups 715 and 716 that may be similar in any respect to magnetic eyecups 15 and 16 of FIG. 1, respectively. The output optical device 711 with the releasably coupled eyecup assembly 735 may be used with an input optical device assembly similar in any respect to any input optical device assembly described herein.

In some examples, a lateral side of magnetic eyecup 715 may be coupled to a lateral side of magnetic eyecup 716 using any known attachment interface. In one example, this may be any mechanical attachment interface now known or later developed.

In another example, a releasably attachable eyecup assembly may include a single eyecup having an eyecup cover similar to the eyecup cover 617A hingably attached thereto. Some other releasably attachable eyecup assembly may include a single eyecup and any part that may include the magnet arrangement of the eyecup cover 617A.

FIG. 8 schematically illustrates another optical device assembly 800 having a magnetic rear end that both secures and aligns the optical axis of an input optical device 810 (e.g., a smartphone) to an output optical device 811 (e.g., a spotting scope) that includes a beam splitter 805, according to various embodiments. The output optical device 811 may be similar in any respect to output optical device 711, but may also include a beam splitter 805 (e.g., a prismatic beam splitter). The beam splitter 805 may be located inside the output optical device 811, or may be part of an releasably attachable eyecup assembly coupled to the body of the output optical device (a beam splitter that is part of a releasably attachable eyecup assembly may be an accessory that is itself releasably coupled to a body of the releasably attachable eyecup assembly).

The beam splitter 805 may output beams along more than one optical axis. For instance, one or the output beams 801 or 802 may be along an optical axis coincident with a center axis of a magnetic eyecup of the output optical device 811. A second output beam 802 may be along another optical axis that is not coincident with the center axis of the same magnetic eyecup (e.g., along an optical axis that is coincident with a center axis of a different eyecup, such as a different magnetic eyecup, or along some other axis that may be perpendicular, parallel, or oblique with respect to the optical axis/center axis).

The releasably attachable eyecup assembly may have a magnetic rear end similar to any magnetic rear end of any output optical device described herein. It may have any combination of magnetic eyecups and/or magnetic covers. The beam splitter 805 may allow a user to view through the output optical device 811 (e.g., to view output beam 801 through an eyecup of the output optical device 811) while the input optical device receives output beam 802 (i.e. some of the light output by the beam splitter), or vice versa. This way, a user can capture image(s) with the input optical device 810 (e.g., a smartphone) while also viewing through the eyecup of, say, a spotter scope.

In various embodiments, the aggregate magnetic force that couples one eyecup device (e.g., an eyecup) to an adapter system may be different than the aggregate magnetic force that couples another eyecup device (e.g., an eyecup or an eyecup cover) to the adapter system. This may be accomplished using different quantities of magnets in the eyecup devices, using stronger or week magnets in one of the eyecup devices, providing an opposite polarity magnet in the adapter system corresponding to only one of the eyecup devices (the rest of the adapter system may be a metal that is attached to magnets), or the like, or combinations thereof.

Examples

The illustrated embodiments describe some examples within the scope of the disclosure of the present application. However, other embodiments within the scope of this disclosure may include any one of the following examples.

Example 1 is an apparatus comprising an output optical device to magnetically couple to a first side of an adapter system formed of a ferromagnetic material, the output optical device including at least one magnetic eyecup including a surface having ferromagnetic material embedded therein, wherein the surface is configured to rotationally time the adapter system with the output optical device, maintaining an alignment of an optical axis of an input optical device affixed to a second side of the adapter system to an optical axis of a lens of the output optical device for taking picture(s) or video through the lens of the output optical device.

Example 2 includes the subject matter of example 1 or any other example herein, wherein the adapter system is comprised of a ferromagnetic material and the adapter system is compact, having a length or width that is less than a length of width of the input optical device.

Example 3 includes the subject matter of any of examples 1-2 or any other example herein, wherein the at least one magnetic eyecup comprises a first magnetic eyecup, and wherein the output optical device further comprises a second magnetic eyecup; wherein the adapter system further comprises a first section comprised of the ferromagnetic material and a second alignment section comprised of the ferromagnetic material or another ferromagnetic material; wherein the first section of the adapter system magnetically couples to the surface of the first magnetic eyecup; and wherein the second alignment section of the adapter system magnetically couples to a surface of the second magnetic eyecup.

Example 4 includes the subject matter of any of examples 1-3 or any other example herein, wherein the first section is part of an adapter body of the adapter system; and wherein the second alignment section is part of an additional adapter body of the adapter system, or the second alignment section is part of an alignment arm of the adapter body.

Example 5 includes the subject matter of any of examples 1-4 or any other example herein, wherein the second alignment section includes one or more alignment magnets.

Example 6 includes the subject matter of any of examples 1-5 or any other example herein, wherein the adapter system further comprises a first section comprised of the ferromagnetic material and a second alignment section; wherein the second alignment section magnetically couples to a first part of the surface of a magnetic eyecup of the at least one magnetic eyecup; and wherein the first section magnetically couples to a second different part of the same magnetic eyecup of the at least one magnetic eyecup or to a magnetic cover for the same magnetic eyecup.

Example 7 includes the subject matter of any of examples 1-6 or any other example herein, wherein an eyecup cover of the at least one magnetic eyecup is arranged to magnetically couple to a first section of the adapter system, and wherein the at least one magnetic eyecup is arranged to magnetically coupled to a second alignment section of the adapter system.

Example 8 includes the subject matter of any of examples 1-7 or any other example herein, wherein the second alignment section includes one or more alignment magnets.

Example 9 includes the subject matter of any of examples 1-8 or any other example herein, wherein the input optical device comprises a smartphone and the second side of the adapter system is configured to affix to a subarea of a back side of the smartphone, wherein the adapter system comprises one or more adapter bodies, and at least one adapter body of the one or more adapter bodies comprises a ferromagnetic metal plate.

Example 10 includes the subject matter of any of examples 1-9 or any other example herein, wherein the surface of the at least one eyecup comprises a non-recessed surface.

Example 11 is an apparatus comprising an adapter system having 1) a first side to couple, via magnetic forces, to at least one eyecup device, and 2) a second opposite side to attach to an input optical device; the adapter system including a main section and an alignment section to rotationally time the adapter system with the at least one eyecup device, maintaining an alignment of an optical axis of the input optical device to an optical axis associated with the at least one eyecup device; the main section to couple, via a first magnetic force of the magnetic forces, to the at least one eyecup device; and the alignment section to couple, via a second magnetic force of the magnetic forces, to the at least one eyecup device.

Example 12 is a spotting scope, binoculars, or other optic usable with the adapter system of example 11 or any other example herein.

Example 13 includes the subject matter of any of examples 11-12 or any other example herein, wherein the at least one eyecup device comprises at least one magnetic eyecup.

Example 14 includes the subject matter of any of examples 11-13 or any other example herein, further comprising a magnetic eyecup and an eyecup cover; the main section to couple, via the first magnetic force, to one of the magnetic eyecup and the eyecup cover; the alignment section to couple, via the second magnetic force of the magnetic forces, to the other one of the magnetic eyecup and the eyecup cover.

Example 15 is a spotting scope other optic having a single eyecup and usable with the adapter system of examples 11-14 or any other example herein, wherein a first exterior region of the spotting scope or other optic magnetically couples to the main section and a second exterior region of the spotting scope or other optic magnetically couples to the alignment section.

Example 16 includes the subject matter of any of examples 11-15 or any other example herein, wherein the adapter system comprises a single body.

Example 17 includes the subject matter of any of examples 11-15 or any other example herein, wherein the adapter system comprises more than one body, wherein the main section and the alignment section are part of different bodies of the more than one body.

Example 18 includes the subject matter of any of examples 11-17 or any other example herein, wherein the alignment system has a thickness that is less than a thickness of the input optical device.

Example 19 includes the subject matter of any of examples 11-18 or any other example herein, wherein the second side is arranged to cover some portion of a back of the input optical device, leaving sides of the input optical device uncovered.

Example 20 includes the subject matter of any of examples 11-19 or any other example herein, wherein the second side is further arranged to cover only part of the back of the input optical device.

Example 21 includes the subject matter of any of examples 11-20 or any other example herein, wherein the first and second magnetic forces have different magnitudes.

Example 22 includes the subject matter of any of examples 11-21 or any other example herein, wherein the magnitude of the first magnetic force is greater than the magnitude of the second magnetic force.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An apparatus, comprising:

an output optical device to magnetically couple to a first side of an adapter system formed of a ferromagnetic material, the output optical device including at least one magnetic eyecup including a surface having ferromagnetic material embedded therein, wherein the surface is configured to, magnetically, rotationally time the adapter system with the output optical device, maintaining an alignment of an optical axis of an input optical device affixed to a second side of the adapter system to an optical axis of a lens of the output optical device for taking picture(s) or video through the lens of the output optical device;

the magnetic rotational timing characterized in that, when the output optical device is spaced apart a minimum distance from the input optical device:

a magnetic force associated with the ferromagnetic material restricts both:

1) Separation of the first side of the adapter system from the at least one magnetic eyecup, and 2) rotation of the first side of the adapter system relative to the at least one magnetic eyecup.

2. The apparatus of claim 1, wherein the adapter system is compact, having a length or width that is less than a length of width of the input optical device.

3. The apparatus of claim 1, wherein the at least one magnetic eyecup comprises a first magnetic eyecup, and wherein the output optical device further comprises a second magnetic eyecup;

wherein the adapter system further comprises a first section comprised of the ferromagnetic material and a second alignment section comprised of the ferromagnetic material or another ferromagnetic material;

wherein the first section of the adapter system magnetically couples to the surface of the first magnetic eyecup; and wherein the second alignment section of the adapter system magnetically couples to a surface of the second magnetic eyecup.

4. The apparatus of claim 3, wherein the first section is part of an adapter body of the adapter system; and wherein the second alignment section is part of an additional adapter body of the adapter system, or the second alignment section is part of an alignment arm of the adapter body.

5. The apparatus of claim 3, wherein the second alignment section includes one or more alignment magnets.

6. The apparatus of claim 1, wherein the adapter system further comprises a first section comprised of the ferromagnetic material and a second alignment section;

wherein the second alignment section magnetically couples to a first part of the surface of a magnetic eyecup of the at least one magnetic eyecup; and wherein the first section magnetically couples to a second different part of the same magnetic eyecup of the at least one magnetic eyecup or to a magnetic cover for the same magnetic eyecup.

7. The apparatus of claim 1, wherein an eyecup cover of the at least one magnetic eyecup is arranged to magnetically couple to a first section of the adapter system, and wherein the at least one magnetic eyecup is arranged to magnetically coupled to a second alignment section of the adapter system.

8. The apparatus of claim 6, wherein the second alignment section includes one or more alignment magnets.

9. The apparatus of claim 1, wherein the input optical device comprises a smartphone and the second side of the adapter system is configured to affix to a subarea of a back side of the smartphone, wherein the adapter system comprises one or more adapter bodies, and at least one adapter body of the one or more adapter bodies comprises a ferromagnetic metal plate.

10. The apparatus of claim 1, wherein the surface of the at least one eyecup comprises a non-recessed surface.

11. An apparatus, comprising:

an adapter system having 1) a first side to couple, via magnetic forces, to at least one eyecup device, and 2) a second opposite side to attach to an input optical device;

the adapter system including a main section and an alignment section to, magnetically, rotationally time the adapter system with the at least one eyecup device, maintaining an alignment of an optical axis of the input optical device to an optical axis associated with the at least one eyecup device;

the main section to couple, via a first magnetic force of the magnetic forces, to the at least one eyecup device; and the alignment section to couple, via a second magnetic force of the magnetic forces, to the at least one eyecup device, wherein a portion of the first side, the portion of the first side magnetically attracted to the at least one eyecup device, comprises a completely flat ferromagnetic surface.

12. A spotting scope, binoculars, or another optic usable with the adapter system of claim 11.

13. The spotting scope, binoculars, or the other optic of claim 12, wherein the at least one eyecup device comprises at least one magnetic eyecup.

14. The spotting scope, binoculars, or the other optic of claim 12, further comprising a magnetic eyecup and an eyecup cover;

the main section to couple, via the first magnetic force, to one of the magnetic eyecup and the eyecup cover;

the alignment section to couple, via the second magnetic force of the magnetic forces, to the other one of the magnetic eyecup and the eyecup cover.

15. A spotting scope or another optic having a single eyecup and usable with the adapter system of claim 11, wherein a first exterior region of the spotting scope or the other optic magnetically couples to the main section and a second exterior region of the spotting scope or the other optic magnetically couples to the alignment section.

16. The apparatus of claim 11, wherein the adapter system comprises a single body.

17. The apparatus of claim 11, wherein the adapter system comprises more than one body, wherein the main section and the alignment section are part of different bodies of the more than one body.

18. The apparatus of claim 11, wherein the alignment system has a thickness that is less than a thickness of the input optical device.

19. The apparatus of claim 11, wherein the second side is arranged to cover a portion of a back of the input optical device, leaving sides of the input optical device uncovered.

20. The apparatus of claim 19, wherein the portion of the back of the input optical device comprises only part of the back of the input optical device.

21. The apparatus of claim 11, wherein the first and second magnetic forces have different magnitudes.

22. The apparatus of claim 21, wherein the magnitude of the first magnetic force is greater than the magnitude of the second magnetic force.

* * * * *